Nov. 30, 1971  J. A. HOLLY  3,623,188
MOLDING APPARATUS
Filed Nov. 28, 1969  4 Sheets-Sheet 1

INVENTOR.
JAMES A. HOLLY
BY Hofgren, Wegner, Allen, Stellman & McCord
ATTORNEYS.

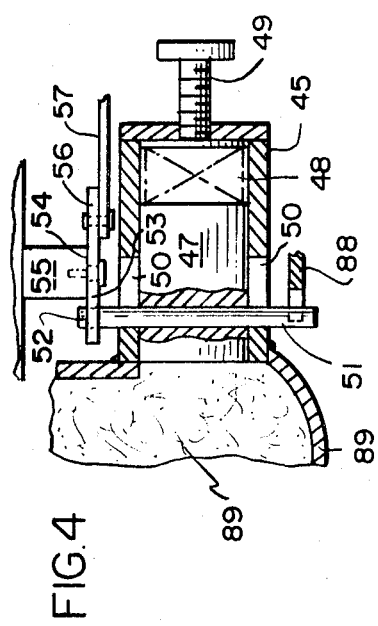
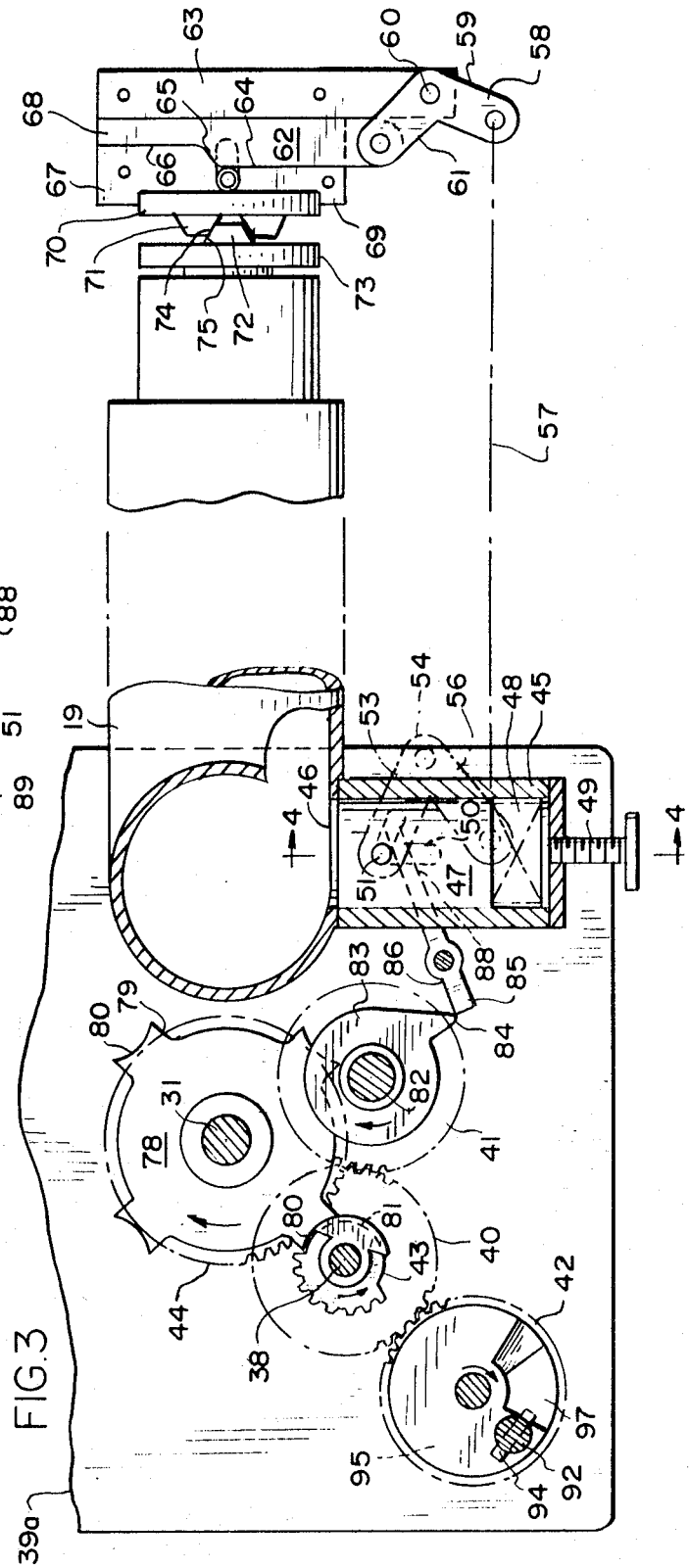

Nov. 30, 1971   J. A. HOLLY   3,623,188
MOLDING APPARATUS
Filed Nov. 28, 1969   4 Sheets-Sheet 4
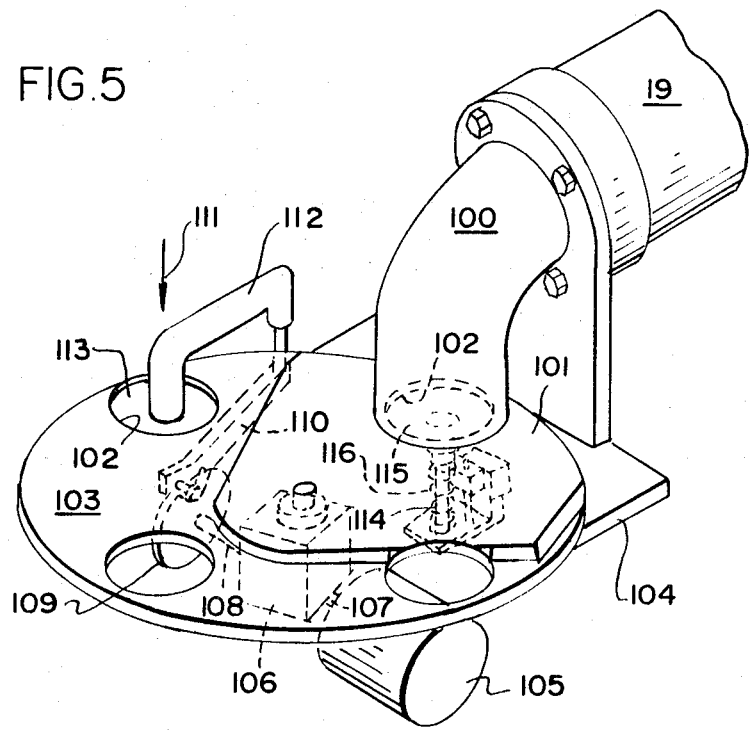
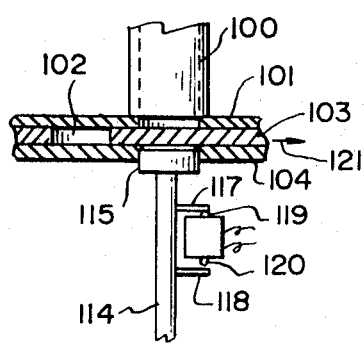
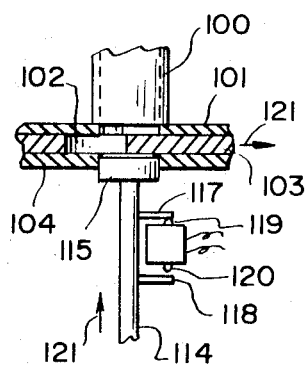
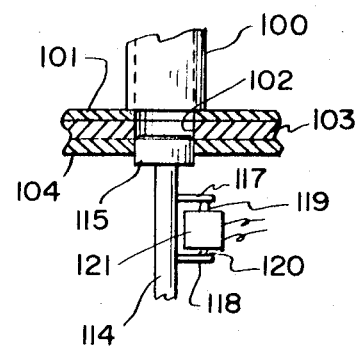

United States Patent Office 3,623,188
Patented Nov. 30, 1971

3,623,188
MOLDING APPARATUS
James A. Holly, Richton Park, Ill., assignor to
Hollymatic Corporation
Filed Nov. 28, 1969, Ser. No. 880,695
Int. Cl. A22c 7/00
U.S. Cl. 17—32                                     21 Claims

ABSTRACT OF THE DISCLOSURE

Molding apparatus for molding articles such as patties from a plastic material such as ground raw meat comprising a mold having a mold opening, force feed means such as a grinder screw for moving the material into the mold opening under increasing pressure as the force feed means is operated, means for terminating the feeding when the material in the mold opening reaches a predetermined pressure corresponding to a desired density of the article in the mold opening and means for thereupon removing the article from the mold opening, the molded article itself thereby acting as a part of the timing mechanism to terminate the feeding when the article has achieved the desired density or consistency.

The apparatus of this invention not only uses the article itself to control the timing of the feeding movement, but in certain embodiments it also controls the moving of the mold. Thus the material such as ground meat, ground fish or other finely divided food material can vary widely in consistency, texture, moisture content and other variable characteristics and the feeding rate itself can vary without affecting the character of the molded article as the desired consistency of the molded article itself is used to time the operation of the apparatus so that successive articles such as shaped patties are formed that are substantially unvarying in density or compactness despite wide varations in the physical characteristics of the material being molded and the feeding rate.

One of the features of this invention is to provide a molding apparatus having control means such that the characteristics of the article being molded forms a key element in the timing mechanism that controls the desired characteristics of the molded article.

Other features and advantages of the invention will be apparent from the following description of certain embodiments thereof taken in conjunction with the accompanying drawings. Of the drawings:

FIG. 3 is a horizontal sectional view with parts broken away to illustrate their relationship to each other in the apparatus of this embodiment.

FIG. 4 is a fragmentary vertical sectional view taken along the line 4—4 of FIG. 3.

FIG. 5 is a fragmentary perspective view illustrating a second embodiment of the invention.

FIGS. 6, 7 and 8 are semi-diagrammatic fragmentary sectional views showing successive positions of certain operating parts of the embodiment of FIG. 5.

Figure 1:
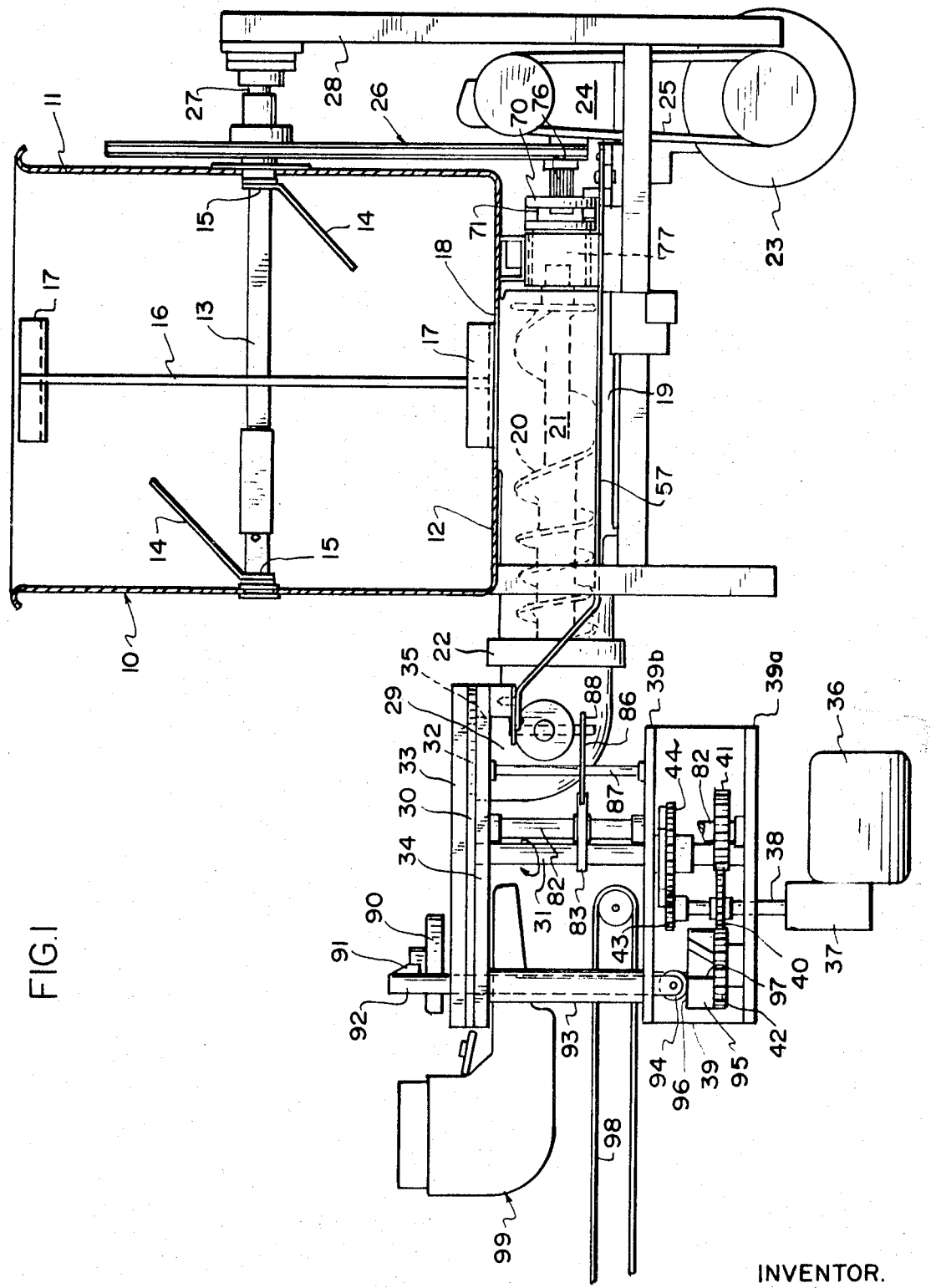
FIG. 1 is a side elevational view partially in section of an appartus embodying the invention.

In the embodiment of FIGS. 1–4 there is provided a mixer 10 for mixing coarsely cut portions of meat and especially beef preparatory to grinding the material and shaping it into ground beef patties in the succeeding portions of the apparatus. The mixer 10 is of the type disclosed and claimed in my copending application Ser. No. 742,329, filed July 3, 1968, now Patent 3,548,903 which issued Dec. 22, 1970 and is assigned to the same assignee as the present application. This mixer 10 comprises a vat 11 with an open top that serves as a mixing chamber. The vat 11 has a rounded bottom 12 that is substantially concentric with a generally horizontal shaft 13 whose ends engage the sides of the vat 11 and which can be contracted to remove the shaft and structure associated therewith for cleaning.

The shaft 13 carries at opposite ends a plurality of mixing blades 14 that are mounted on transverse end arms 15 that are generally similar to a centrally located arm 16 positioned at the vertical center of the vat 11 and also mounted for rotation with the shaft 13. Each end of the arm 16 carries a blade 17 which is sloped to urge the meat from the vat 11 through a bottom central opening 18.

The opening 18 communicates with a tubular or cylindrical casing 19 that forms a meat receiving grinding chamber. Positioned within the chamber 19 is a meat moving or feeding screw 20 of the customary type that on rotation with its axial shaft 21 forces the meat through a grinder head 22 of the customary type with the usual apertured grinding plate and severing blades (both not shown).

The mixing shaft 13 as well as the grinding shaft 21 are rotated by an electric motor 23 that drives a gear reducer 24 for turning the axial grinding shaft 21 by means of a first belt 25 with this gear reducer 24 also driving a drve chain 26 for rotating the mixer shaft 13 and thus the mixing blades 14. This chain 26 rotates a shaft 27 whose outer end is rotatably held in a frame 28.

At the exit end of the grinder head 22 there is an upwardly opening right angled extension 29 on the force feed means tube or grinding chamber casing 19. Positioned above this generally horizontal upper end of the tube extension 29 is a rotatable mold plate 30 that is mounted for rotation on a vertical shaft 31. This mold plate 30 in the embodiment shown contains four equally spaced circular mold openings 32. The mold plate 30 is movably held between top 33 and bottom 34 plates. The bottom plate 34 is provided with an opening 35 substantially coinciding with the horizontal exit of the tube extension 29 so that ground meat or the like can pass upwardly from this extension into the overlying mold opening 32.

The mold plate 30 is rotated by its own electric motor 36 and gear reducer 37 from which extends a vertical shaft 38 into a gear box 39 having a bottom plate 39a and a top plate 39b. Mounted on the vertical shaft 38 is a circular gear 40 which operates as a main drive gear. The drive gear 40 engages on one side a reset drive gear 41 to be described in detail hereinafter. The other side of the drive gear 40 engages a knockout cam gear 42 also to be described in greater detail hereinafter.

The upper end of the vertical drive 38 beyond the drive gear 40 carries a segment gear 43 which during rotation of the drive shaft 38 engages periodically a circular gear 44 which is mounted on the bottom end of the vertical mold plate drive shaft 31. During each engagement of the segment gear 43 with the mold plate gear 44 the mold plate is rotated a fraction of its complete rotation, here illustrated at 90°, because of the four mold openings provided. Thus this segment gear 43 engaging the mold plate gear 44 turns the mold plate 90°.

Mounted on the side of the grinder chamber casing or feed tube 19 is a generally cylindrical cylinder 45 having an open inner end 46 communicating with the interior of the tube 19. Positioned within this cylinder 45 is a movable piston 47 that is urged toward the tube 19 by a compression spring 48 whose force is adjustable by means of an outwardly extending adjusting screw 49.

Extending through the piston 47 and through aligned upper and lower parallel slots 50 in the cylinder 45 is a vertically extending pin 51 with the upper and lower ends exposed as illustrated in FIG. 4. The upper end 52 of this pin engages one arm 53 of a bell crank lever 54 that is pivotally mounted on a post 55. The other arm 56 of the bell crank 54 is hingedly connected to one end of a generally horizontal link arm 57. This link arm 57 extends rearwardly along the grinding chamber casing or feed tube 19 and has its opposite end hingedly connected to an arm 58 of a second bell crank lever 59. This arm is also pivoted at about its center around a mounting 60 and the other arm 61 of this bell crank is hingedly connected to a slide block 62 that is mounted for sliding movement against a base 63.

The surface of the block 62 opposite the base 63 is in two spaced planes connected by a curved surface portion 65 and with this surface 64 bearing against a similarly shaped surface 66 of a clutch operating block 67. Thus the surfaces 64 and 66 are complementary to each other and function as inclined surfaces to move the clutch block 67 to extended position as shown in FIG. 3 or to retracted position when the slide block 62 is withdrawn to where the narrow end 68 of the block 62 coincides with the narrow end 69 of the clutch operating block 67.

The two blocks 62 and 67 are essentially elongated strips with the block 67 carrying a first clutch element 70 of generally circular configuration on which are located a pair of diagrammatically opposite circular members 71. The pair of circular members 71 are thusly moved into and out of engagement with a similar pair of clutch members 72 on a similar clutch element 73. The clutch members 71 and 72 have sloped engaging surfaces 74 and 75 that when unrestrained tend to urge the clutch elements apart or toward disengaged position.

Figure 2:
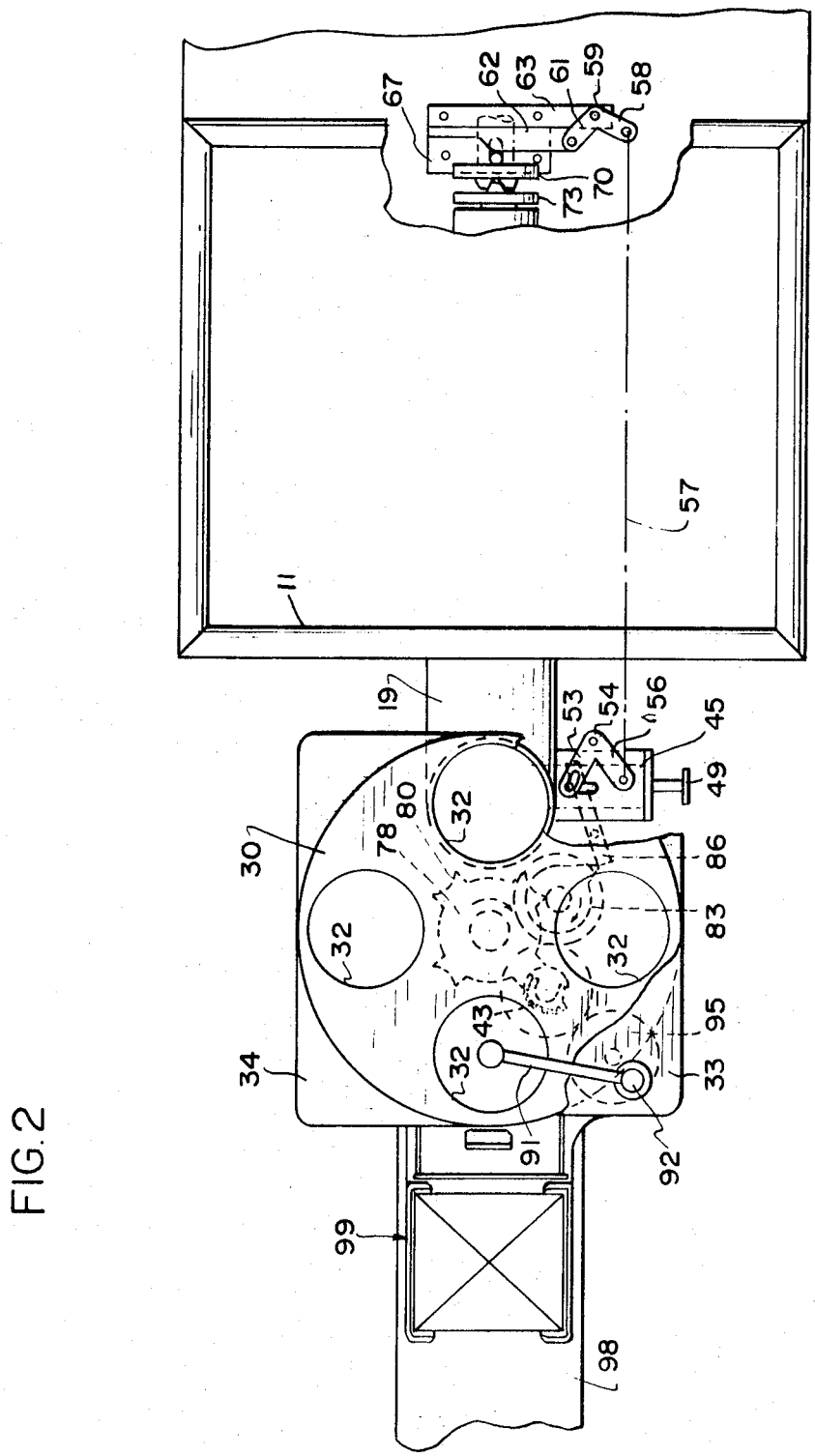
FIG. 2 is plan view partially broken away of the apparatus of FIG. 1.

As can be seen most clearly in FIG. 1, the laterally movable clutch element 70 is mounted for movement along a splined shaft 76 extending horizontally from the gear reducer 24. The other clutch element 73 is connected to the driving end 77 of the axial grinding shaft 21. Thus when the clutch element 70 has been moved to the left as shown in FIGS. 1–3 to engage the clutch members 71 and 72 the rotation of the shaft 76 rotates the feed screw 20 and forces the meat that has been expelled from the mixer chamber vat 11 through the grinder head 22 and up into the mold opening 23. Movement of the clutch element 70 to the right however as shown in these figures to disengage the clutch member 71 and 72 immediately stops the grinding.

In order to hold the mold plate stationary while the mold opening 32 immediately above the tube extension 29 is being filled the mold operating gear 44 has attached thereto a plate 78 that has located on its circumference four projections 79 spaced 90° apart and each having an inwardly arcuate outer end 80 engaged by a similar arcuate surface 81 on the segment gear 43 for holding the mold plate stationary during the filling of each mold opening.

In order to return or reset the clutch to its operating engagement there is provided a reset shaft 82 extending upwardly from the gear box 39 and carrying a reset cam 83. This shaft 82 is rotated by its circular gear 41 that is also in engagement with the circular drive gear 40. The reset cam 83 is rotated in a clockwise direction, as viewed in FIG. 3, and includes a peripheral extension 84 that on rotation engages the adjacent end 85 of a reset lever 86 that is pivotally mounted on a vertical shaft 87. The end 88 of the lever 86 that is opposite the end 85 engages the lower end of the vertical pin 51 so that counterclockwise movement of the reset lever 86 to the position shown in FIG. 3 serves to return the piston 47 to its normal location adjacent the inner or grinding chamber tube end 46 of the cylinder 45.

The operation of the apparatus of this invention as related to the embodiment of FIGS. 1–4 is as follows. With the parts in the position shown operation of the drive motor 23 serves to rotate the mixing paddles 14 and 17 within the vat 11 to mix the meat contained therein. The paddles 17 force the meat through the bottom opening 18 into the grinder chamber casing or tube 19 where the grinder screw 20 forces the meat to the left as viewed in FIGS. 1–3. The grinding screw forces the meat through the grinding head 22 where it is finely ground and from there upwardly in the angular extension 29 into the mold opening 32 that is in position to receive the meat.

As the ground meat 89 is forced into the opening it of course becomes more and more dense because of the continuous operation of the pressure applying feed screw 20. At a preselected density which corresponds to the degree of compactness desired in the resulting patty the piston 47 moves outwardly which as viewed in FIG. 3 is downwardly and in FIG. 4 is to the right against the force of the preadjusted compression spring 48. This movement of the piston also moves the transverse pin 51 in its oppositely located guide slots 50.

This outward movement of the pin 51 causes the upper end thereof to rotate the bell cranks 54 and 61 because the first bell crank 54 has one arm connected to the pin 51 while the second bell crank 61 is connected to the first bell crank by means of the link arm 57.

At a sufficient degree of outward movement of the piston 47 the sliding block 62 is retracted or moved downwardly as viewed in FIG. 3 to a point where the sloped surfaces 74 and 75 of the clutch members 71 and 72 force them apart. This disengagement of the clutch members immediately stops the rotation of the feed screw 20 as the meat 89 in the mold opening 32 has attained the present desired degree of compactness.

Because of the preselected speed of rotation of the mold plate 30 the mold opening 32 remains in communication with the meat 89 until after the feed screw rotation and grinding of the meat has stopped. Subsequent to this stopping the motor 36 and gear reducer 37 operating the segment gear 43 index the mold plate 30 90° to move the filled mold opening 32 away from the grinder and to move the next succeeding mold plate 32 into position above the grinder outlet 35.

As was explained above, the mold plate 30 is held stationary between these 90° movements by engagement of each arcuate surface 80 with the corresponding arcuate surface 81 of the segment gear 43.

The rotation of the reset shaft 82 is four times the rate of rotation of the mold plate shaft 31. This means that each time the mold plate shaft 31 is rotated 90° the reset shaft 82 is rotated 360°. This results in the reset cam extension 84 engaging the reset lever 86 on each movement of the mold opening 32 from filling position for a distance of 90° so that the lever 86 is pivoted counterclockwise to the position shown in FIG. 3 which moves the piston 47 inwardly to its original position adjacent the tube 19. This movement of the piston operating through the bell cranks 54 and 61 by reason of the interconnecting link arm 57 again moves the clutch elements 70 and 73 into engagement to again start the grinding screw 20 and fill this next mold opening 32 as described.

In the illustrated embodiment when the filled mold opening 32 is moved to a position 180° from the fill position at the tube 19 the patty is removed from the opening by means of a knockout ring 90 that is mounted on an arm 91 that is in turn held on a vehicle shaft 92 slidably mounted in a sleeve 93. The lower end of this shaft 92 carries a roller 94 which rolls on the upper surface of a circular knockout cam 95. This cam surface 96 is generally horizontal for the greater portion of its circumference but is recessed at a portion 97 to permit the shaft 92 to drop so that the ring 90 enters the mold opening and forcibly ejects the patty therefrom to drop onto a moving conveyor belt 98 or similar support surface. In so dropping, the patty (not shown) picks up a sheet of separator paper supplied by a paper feed 99 which in the illustrated embodiment is the same as that shown in U.S. Patent 3,126,683 assigned to the same assignee as the present application.

In the embodiment shown in FIGS. 5–8, the grinding chamber casing or tube 19 feeds into a downwardly extending elbow 100 and from there through a cover plate 101 into a mold opening 102 in a circular mold plate 103 that is substantially the same as the mold plate 30 in the first embodiment.

The mold plate 103 adjacent the elbow 100 is backed up by a bottom support plate 104 so that the mold plate 103 is rotatably movable between the upper and lower plates 101 and 104.

The mold plate 103 is rotated by an electric motor 105 through a gear box 106 into which the motor shaft 107 extends. Extending from the gear box 106 is a shaft 108 which carries a knockout cam 109. This cam permits the cam follower arm 110 to drop downwardly because of the force of the spring or other force applying means, not shown but indicated by the arrow 111. This cam follower 110 carries a knockout arm 112 similar to the arm 91 in the first embodiment with this arm also carrying a knockout ring 113 adapted to enter its mold opening 102 and thereby remove the patty (not shown) therefrom.

In order to cause the density of the patty to control the formation thereof in the manner described in the first embodiment there is provided a vertically movable arm 114. This arm 114 has a patty sensor head 115 that is positioned to coincide with the mold opening 102 during filling thereof. During the filling of the mold opening the vertical arm is moved downwardly by the increasing pressure of the incoming meat forced therein by the feed screw in the same manner as described above in the embodiment of FIG. 1. This compresses a resistance spring 116 and serves to time the operation of the device as previously described.

As is shown schematically in FIGS. 6, 7 and 8 the vertically movable arm 114 that is moved by the sensor head 115 is provided with a pair of outwardly projecting switch engaging members 117 and 118. The upper member 117 controls the energizing of the mold plate motor 105. The lower member 118 controls the energizing of the drive motor of the grinder. This drive motor is not illustrated in the embodiment of FIGS. 5–8 but is generally similar to the motor 23 of the first embodiment in that it rotates a grinding and feed screw which is within the casing 19 that is similar to the feed screw 20 of the first embodiment.

When the patty sensor head 115 is in elevated position within the mold opening 102 that is being filled from the feed elbow 100 the sensor head 115 is raised into the mold opening 102 as shown in FIG. 8 and the mold plate 103 is stationary. The upper member 117 is thereby elevated so that the mold plate rotating switch arm 119 is raised to open position thereby de-energizing the mold plate motor 105.

The lower switch engaging member 118 is also raised to elevate the switch arm 120 to close the grinder motor switch for both switches are contained within the housing 121.

Thus, with the patty sensor head 115 elevated in the position of FIG. 8 the mold plate 103 is stationary while the grinder continues to operate to fill the mold opening that is in communication with the elbow 100. The incoming meat when it has been compressed to the desired degree forces the head 115 downwardly to the position shown in FIG. 6. In this position the grinder switch arm 120 is in open position to stop the grinder while the mold plate operating switch arm 119 is in closed position to rotate the mold plate so that the filled mold opening is moved to discharge position at the knockout ring 113 and the next opening is moved into position to be filled.

Movement of the mold plate 103 continues in the direction indicated by the arrow 121 until the next mold opening 102 is again brought into conjunction with the sensor head 115 after which an urging means illustrated by the arrow 121 again moves the sensor head 115 and attached vertical arm 114 into alignment with the mold opening 102 where again the mold plate is stopped but would energize its motor 105 and the grinding is started again to fill this next mold opening.

As can be seen from the above description the apparatus of this invention provides a structure in which the meat or other moldable material is continually fed into the mold opening until the desired degree of compactness of material in the opening is achieved after which feeding is automatically terminated and the mold plate indexed to the next succeeding position preparatory to filling another mold opening or to removal of the molded article or both. This is extremely important when the moldable material is a variable material such as ground meat because with this apparatus regardless of the rate of feed and regardless of the varying nature of succeeding portions of the meat or similar material the successive articles or patties will always be of substantially the same preselected degree of compactness desired.

In the first embodiment the mold plate is moved at such a rate that the mold openings are always filled to the desired degree before the plate is indexed to the next position. In the embodiment of FIGS. 5–8 each mold opening is filled in succession to the desired degree of compactness but in this second embodiment this degree of compacting also operates the mold plate moving or indexing mechanism.

As can be seen from the above description the feeding of the ground meat plastic material into any of the mold openings is automatically terminated when a sufficient amount of material has been fed into the opening. This is accomplished by using the density or compactness of the molded article such as the illustrated patty to operate as a timer. The terminating of the feeding is accomplished in the illustrated embodiments by stopping the pressure applying feeding means such as the feeding screw. The terminating can also be accomplished by continuing operation of the feeding means but moving the mold so as to move the filled opening away from the meat feeding means and moving an empty opening into register with the feeding means so that the empty opening will immediately begin to be filled. In such instances the feeding means as embodied in the feed screw 20 of FIG. 1 can continue to operate as such operation does not harm the plastic material.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. Molding apparatus for molding articles from a plastic material, comprising: a mold having mold openings therein; force feed means communicating with a said opening for moving said material into a said opening under increasing pressure; means for interrupting the feeding of the material into said opening when the material in said opening reaches a predetermined pressure corresponding to a desired density of said article in the opening; means for maintaining said pressure on said article in said opening during said interrupting; and means for thereafter moving said opening and said article contained therein out of communication with said force feed means.

2. The apparatus of claim 1 wherein said plastic material is a ground material, said force feed means comprises a tube having an exit at the mold for flowing said material through the tube into the mold opening and a feed screw within the tube for said moving of the material into the opening, said tube and feed screw comprising parts of a grinder.

3. The apparatus of claim 2 wherein there is provided a mixer for said plastic material having an exit opening and means for forcing mixed material from the mixer through the opening into the tube for engagement by the grinder feed screw.

4. The apparatus of claim 1 wherein said mold comprises a mold plate having a plurality of spaced openings, and there are provided means for moving the mold plate from communication with said force feed means during said interrupting of the feeding of said material and for simultaneously moving an empty mold opening into communication with said force feed means.

5. The apparatus of claim 4 wherein there are provided means for moving said mold plate only during said interrupting of said feeding to move the opening having the article therein out of communication with the feed means and to move a succeeding empty opening into communication with said feed means.

6. The apparatus of claim 10 wherein said means for interrupting comprises a clutch including separable clutch elements, and a movable member subjected to said material in the mold opening and movable as a result of said increasing pressure of material in the opening, and there are provided means operatively associated with said means for moving the mold plate for returning said movable member to its initial position and for moving said clutch elements into engagement with each other.

7. The apparatus of claim 5 wherein said means for interrupting comprises a clutch including separable clutch elements, said movable member being subjected to said material in the mold opening and movable as a result of said increasing pressure of material in the opening, and there are provided means operatively associated with said means for moving the mold plate for returning said movable member to its initial position and for moving said clutch elements into engagement with each other, and wherein said mold moving means includes means for rotating said plate, said means for returning comprising a cam plate rotatable with said mold plate and a cam follower engaging said cam plate and operatively connected to said clutch elements.

8. The apparatus of claim 1 wherein there are provided means for maintaining said predetermined pressure on the material in the mold opening during said interrupting of said feeding and prior to said moving of said opening and its article out of communication with said force feed means.

9. The apparatus of claim 8 wherein said force feed means comprises a tube having an exit at the mold for flowing said material through the tube into the mold opening and a rotatable feed screw within the tube extending substantially across the full width thereof for said moving of the material into the mold opening, said feed screw when stopped thereby comprising said means for maintaining said predetermined pressure on the material.

10. The apparatus of claim 9 wherein there is provided a grinding head between said mold opening and the adjacent end of said feed screw so that said material is further subdivided in passing through said grinding head to the mold.

11. The apparatus of claim 9 wherein said plastic material is a ground material and there is provided a grinder comprising said tube and feed screw.

12. The apparatus of claim 1 wherein said means for interrupting the feeding of the material comprises a movable member subjected to said material in the mold opening and movable as a result of said increasing pressure of material in the opening, said force feed means comprises a clutch and there is provided a lever system interconnecting said movable member and said clutch for inactivating the clutch and thereby de-energizing the force feed means on movement of said movable member, said clutch comprising a pair of clutch members having sloped surfaces normally in engagement during said moving of the material that tend to force said clutch members apart.

13. Molding apparatus for molding articles from a plastic material, comprising: a movable mold having a plurality of mold openings therein; force feed means for pressing said material into a first said opening under increasing pressure; means for interrupting said force feed means when the material in said opening reaches a predetermined pressure corresponding to a desired density of said article in the opening; means for thereafter moving said mold plate during said interrupting to bring a subsequent opening into material receiving position; means for again activating said force feed means to force material into said subsequent opening; and means for removing the article from the first said opening.

14. The apparatus of claim 13 wherein said plastic material is a ground material, and said force feed means comprises a grinder comprising a tube having an exit at the mold for flowing said material through the tube into the mold opening, a feed screw within the tube for said moving of the material into the opening, and a grinding head between said feed screw and said mold.

15. The apparatus of claim 14 wherein there is provided a mixer for said plastic material having an exit opening and means for forcing mixed material from the mixer through the opening into the tube for engagement by the grinder feed screw.

16. The apparatus of claim 13 wherein said force feed means comprises a tube having an exit at the mold for flowing said material through the tube into the mold opening and a rotatable feed screw within the tube extending substantially across the full width thereof for said moving of the material into the mold opening, said feed screw when stopped thereby comprising said means for maintaining said predetermined pressure on the material during said interrupting.

17. The apparatus of claim 13 wherein said means for interrupting comprises a movable member subjected to said material in the mold opening and movable as a result of said increasing pressure of material in the opening, said force feed means comprises a pair of clutch elements and there is provided a lever system interconnecting said movable member and one of said clutch elements for separating the clutch elements and thereby de-energizing the force feed means on movement of said movable member.

18. The apparatus of claim 13 wherein there are provided means mounting said mold plate for rotation and said means for moving comprises means for rotating the mold plate periodically in successive arcuate increments with said means for rotating including intermeshing gears, said means for interrupting comprises a movable member subjected to said material in the mold opening and movable as a result of said increasing pressure of material in the opening and wherein there are provided means operatively associated with said means for moving the mold plate for returning said movable member to its initial position and for returning said clutch elements into engagement with each other, said means for returning said movable member and clutch elements comprising a cam rotatable with said gears and a cam follower engaging said cam and operatively engaging said movable member and clutch elements.

19. Molding apparatus for molding articles from a plastic material, comprising: a mold having a mold opening therein; electrically operated first means for moving said mold; electrically operated force feed means for moving said material into said opening under increasing pressure; movable switch means for interrupting said force feed means when the material in said opening reaches a predetermined pressure corresponding to a desired density of said article in the opening; movable switch means for energizing said first means when the material in said opening reaches a predetermined pressure corresponding to a desired density of said article in the opening; and means for thereupon removing said article from the mold opening.

20. The apparatus of claim 19 wherein there is provided a movable arm in contact with said material entering said mold opening with the arm being movable by the increasing pressure of material in said mold opening and engaging both of said movable switch means.

21. The apparatus of claim 20 wherein said arm is provided with a pair of switch engaging members, one engaging the movable switch means for interrupting said force feed means and the other engaging said movable switch means for energizing said first means after said interrupting of said force feed means.

References Cited
UNITED STATES PATENTS

| | | | |
|---|---|---|---|
| 2,668,325 | 2/1954 | Goodwin | 18—30 CR |
| 2,820,247 | 1/1958 | Michaud | 17—32 |
| 3,061,872 | 11/1962 | Holly | 17—32 |

LUCIE H. LAUDENSLAGER, Primary Examiner

U.S. Cl. X.R.

18—30 CR